United States Patent [19]

Rockwood

[11] Patent Number: 4,556,588

[45] Date of Patent: Dec. 3, 1985

[54] DECORATIVE EMBLEM USEFUL IN CUSTOMIZING AN AUTOMOBILE AND OTHER SURFACES

[75] Inventor: Clyde R. Rockwood, Columbus, Ohio

[73] Assignee: The D. L. Auld Company, Columbus, Ohio

[21] Appl. No.: 411,410

[22] Filed: Aug. 25, 1982

[51] Int. Cl.[4] .......... A47G 1/12; B44C 1/26; B32B 1/00

[52] U.S. Cl. .......... 428/13; 428/67; 428/187; 428/542.2; 428/172

[58] Field of Search .......... 428/13, 542.2, 187, 428/67, 174, 172

[56] References Cited

U.S. PATENT DOCUMENTS

| | | | |
|---|---|---|---|
| 2,451,913 | 10/1948 | Brice | 428/67 |
| 2,931,119 | 4/1960 | Gits et al. . | |
| 3,064,717 | 11/1962 | Morrealle et al. . | |
| 3,114,597 | 12/1963 | Lee . | |
| 3,629,042 | 12/1971 | Cranfill | 428/67 |
| 3,887,734 | 6/1975 | Chazan . | |
| 4,087,570 | 5/1978 | Beinbach | 427/44 |
| 4,100,010 | 7/1978 | Waugh . | |
| 4,100,681 | 7/1978 | Hollander . | |
| 4,139,654 | 2/1979 | Reed | 428/174 |
| 4,259,388 | 3/1981 | Reed | 428/174 |
| 4,292,827 | 10/1981 | Waugh . | |
| 4,356,617 | 11/1982 | Coscia . | |

*Primary Examiner*—Marion E. McCamish
*Assistant Examiner*—Beverly Johnson
*Attorney, Agent, or Firm*—Killworth, Gottman, Hagan & Schaeff

[57] ABSTRACT

A decorative emblem useful in customizing an automobile, said emblem being sufficiently flexible to conform to the curvature of a surface by hand pressure alone and comprising a base member and a graphic-bearing inlay, said base member being formed from a hand deformable thermosetting plastic, said inlay including a foil member having a graphic on one surface thereof and having a translucent flexible plastic cap overlaying said graphic surface and providing a lens effect thereto.

7 Claims, 2 Drawing Figures

DECORATIVE EMBLEM USEFUL IN CUSTOMIZING AN AUTOMOBILE AND OTHER SURFACES

BACKGROUND OF THE INVENTION

The present invention relates to a flexible decorative emblem having among other uses customizing automobile surfaces such as the side body, hood, wheel covers and the like and displaying a manufacturer's name or trademark on an automobile or an appliance housing.

Decorative emblems are used in a number of industries for displaying the trade name, trademark or other indicia of a manufacture as well as in novelty items such as key rings, belt buckels and the like where their role is primarily ornamentation. Years ago decorative emblems were formed from vitreous enamel which gave the emblem a glass-like appearance and protected the emblem against weathering. More recently, such emblems have been prepared using plastic in place of the old enamels. For example, Loew, U.S. Pat. No. 3,654,062 discloses an injection molding process for forming a decorative mylar facing.

Waugh, U.S. Pat. No. 4,100,010 discloses a plastic-capped decorative emblem which is formed by casting a polyurethane composition onto the indicia-bearing surface of a decorative foil disc. By holding the disc in a flat, horizontal position and using the appropriate casting techniques, the polyurethane flows to the edge of the disc, stops and builds a positive meniscus, which when cured provides an impact and weather resistant glass-like cap. Reed, U.S. Pat. No. 4,139,654 and Reed, U.S. Pat. No. 4,259,388 disclose plastic-capped emblems formed by casting an uncured plastic composition onto a substrate such as a vinyl or polyester film to form a cap which is cured by irradiation.

Decorative emblems prepared using the teachings of the aforementioned patents are typically coated on the back side with a pressure sensitive adhesive and either applied directly to the surface they are designed to adorn or inserted into a base member or bezel and then attached to the surface. In the former case, if the plastic cap is formed from a material which is flexible when cured, the shape can conform to curved non-planar surfaces. In the latter case, however, the base members which have previously been used have been too rigid to mount the emblem on non-planar surfaces. For example, even when non-planar surfaces such as automobile side bodies and hoods are massed produced, there are variations in the surfaces which make it difficult to obtain good adherenece of ornamentation even when that ornamentation has been molded to have the same curvature as the non-planar surface. As a result, the use of these bezel-mounted emblems has been restricted to flat, substantially planar surfaces. Furthermore, due to their rigidity there has been a tendency for the latter emblems to break upon impact.

Although the base member has limited the usefulness of emblems including the same, the base member serves to frame the capped indicia and many manufacturers use a crest or medallion-like design as part of their trademark and require the base member to faithfully reproduce the trademark. Hence, there is a need for a decorative emblem in which a plastic-capped inlay is retained in a base member and which can conform to non-planar surfaces and resist impact.

SUMMARY OF THE INVENTION

The foregoing need is satisfied in the present invention which provides a decorative emblem which includes a base member wherein the base member is sufficiently flexible to conform to a curved, non-planar surface.

In accordance with one embodiment of the present invention, a decorative emblem is provided comprising a base member and a graphic-bearing inlay wherein the base member is optionally provided with a peripheral rim for retaining the inlay and is formed from a hand deformable molded plastic material and the inlay includes a foil member having a graphic bearing surface and having a translucent flexible plastic cap overlaying the graphic.

The decorative emblems of the present invention have a variety of applications including on automobiles, appliances, as jewelry, and in other novelty items. The plastic cap serves to adorn the underlying graphic and, in the case of its use on automobiles and appliances is impact and/or weather resistant. At the same time, the cap and the base member are able to conform to non-planar surfaces for mounting. It has been found that even when there are substantial variations in the curvature of a non-planar surface, the decorative elements of the present invention can be strongly affixed.

BRIEF DESCRIPTION OF THE DRAWINGS

The present invention will become more clear from the following drawings wherein.

DETAILED DESCRIPTION OF THE INVENTION

Figure 1:
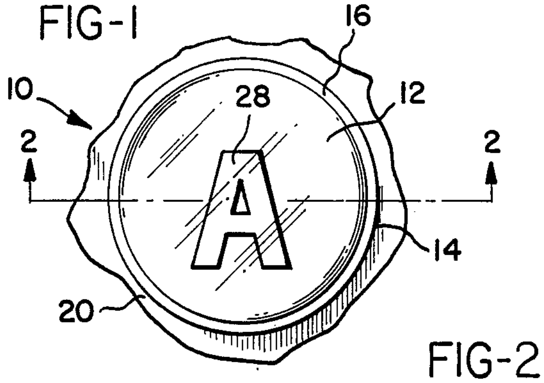
FIG. 1 is a perspective view of a decorative emblem in accordance with the present invention.

A typical decorative emblem in accordance with the present invention is shown in FIG. 1 wherein the emblem is generally designated by the numeral 10 and is made up of a graphic-bearing inlay 12 and a base member 14. The base member 14 is normally provided with a rim 16 which retains the inlay in its position on the member 14 and serves to frame the inlay 12. The term "rim" as used herein includes members formed by a depression as well as a protrusion. Hence, in some embodiments of the invention the inlay 12 may be inset within the base member 14. The rim 16 aids in positioning the inlay on the base member, but it is not required. For example, where a manufacturer's trademark requires the use of a substantially flat base member, the inlay can be positioned using a jig or fixture. In accordance with the present invention the base member 14 may be molded from a plastic material which is sufficiently flexible when cured that it can conform to curved non-planar surfaces such as the surface 20 in FIG. 2.

Figure 2:
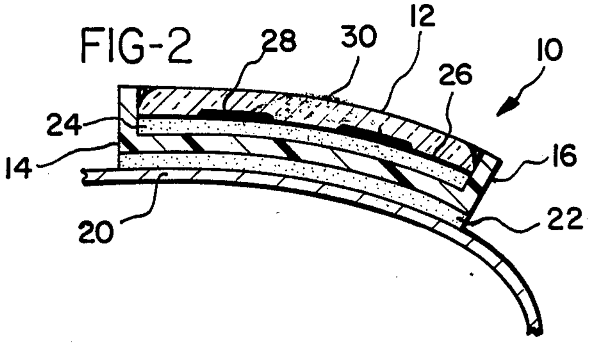
FIG. 2 is a cross-sectional view showing the emblem conforming to a curved surface to which it is affixed.

As can be seen in FIG. 2, the decorative emblem of the present invention 10 is attached to a curved surface 20 in conformance therewith using a layer of a pressure sensitive adhesive 22. Pressure-sensitive adhesives that are useful for this purpose are well known. Other attachment means may be also used. For example, base member 14 may have molded therewith tabs or projections which extend from the attachment surface for press-fitting into corresponding notches or holes on curved surface 20.

In the embodiment illustrated in FIG. 2, the decorative emblem can be considered as being made of two parts, the base member 14 and the capped inlay 12. In many cases, the inlay 12 is attached to the flexible base member 14 with a layer of an adhesive 24 which is coated on the reverse side of foil member 26, and which is the same as or similar to adhesive layer 22. Alternatively, a rim 16 when present can be so dimensioned to provide an interference fit about the inlay 12 and the inlay can be snapped into place in the base member 14.

Foil member 26 carries a graphic 28 (for example a thin layer of paint) on its upper surface which is covered with plastic lens cap 30 which serves to protect and adorn the image as already mentioned. The foil member may be embossed in addition to being painted or printed with a graphic.

The graphic-bearing inlay can be formed by either of the processes disclosed in U.S. Pat. No. 4,100,010 to Waugh or U.S. Pat. No. 4,139,654 to Reed. The foil member is preferably a metal foil such as aluminum, but it may also be a plastic foil such as Mylar or a metalized plastic foil or a paper backed plastic foil.

For best results, the foil must be free of moisture, grease, dust and other foreign matter prior to being decorated. As required, the foil member may be primed prior to printing or painting the surface with the graphic in order to improve the adherence of the foil for the paint and/or printing and to prevent peeling. The graphic may be formed on the foil member using a conventional printing technique such as silk screen printing, roto-gravure, etc.

Shapes according to the trademark, emblem, or medallion to be produced are cut from the foil. Typically, the foil is first pre-printed with the desired design or emblem and cut in registry therewith; although, the shapes may be cut before being decorated in some instances. Application of the plastic lens cap can be accomplished using the system in U.S. Pat. No. 4,100,010 or U.S. Pat. No. 4,139,654.

As explained in more detail in U.S. Pat. No. 4,100,010, the wetting characteristics of the plastic coating composition should be such that when a deposit of the plastic composition is placed on the foil shape it flows to the edge of the shape and builds into a positive meniscus. This plastic deposit is subsequently cured. The plastic may be cured in a number of ways such as by heating or irradiation or in some cases, an "ambient cure" can be effected by the exothermic heat of the curing reaction. In the case of a polyurethane composition, the latter curing is obtained by providing sufficient catalyst to trigger the exothermic reaction. The cured plastic forms a lens cap which gives a lens effect to the graphic surface beneath.

The plastic cap is formed from a material which preferrably is also weather and impact resistant. A preferred plastic is an impact-resistant polyurethane. To conform to non-planar surfaces such as a curved appliance housing or the body of a motor vehicle, the plastic lens cap must be flexible. Polyurethanes having a Shore D hardness of 45 to 65, preferably 45 to 55 are sufficiently flexible for this purpose. Several of these polyurethanes are well known and are described in the aforementioned Waugh patents.

In accordance with the present invention the base member 14 is formed from a flexible plastic which, like the plastic lens cap, can conform to a curved surface. Throughout this specification when it is said that a plastic is sufficiently flexible to conform to a curved surface it will be understood that there is sufficient flexibility in the plastic to affix and conform the decorative emblem to the surface by hand, using an attachment means provided on the back of the emblem to maintain that shape once applied.

The base members are usually formed by injection molding although extrusion molding, compression molding, etc. can also be used. Representative examples of suitable plastics for use in the base member include thermoplastic materials such as thermoplastic polyolefins, polyesters, polyurethanes, styrene-butadiene block copolymers, styrene-isoprene block copolymers, etc. flexible filled and unfilled polyvinylchlorides, cross-linked polyethylene, polytetrafluoroethylene, etc. and soft, thermosetting plastics. Depending on the decorative effect that is desired, the base member may be formed from a plastic which is filled with a colored pigment, or the base member may be painted or covered with a metallic film.

In accordance with another embodiment of the invention, the foil member is placed in the base member prior to application of the lens cap and the plastic of the lens cap is cast directly into the base member. In accordance with this embodiment the base member is usually rimmed. The adhesive layer 24 can be eliminated if the plastic cast into the base member adheres sufficiently to the rim 16 to permanently retain the inlay. When present the adhesive layer 24 and the layer 22 are usually formed from commercially available pressure-sensitive adhesives.

Having described the invention in detail and by reference to specific embodiments thereof, it will be apparent that numerous modifications and variations are possible without departing from the spirit and scope of the appended claims.

What is claimed is:

1. A decorative emblem sufficiently flexible to conform to the curvature of a non-planar surface by hand pressure along comprising:

a base member and a graphic-bearing inlay, said base member being formed from a hand deformable, molded plastic material and provided with a raised rim which completely surrounds and frames said inlay for retaining said inlay in position on said base member with the upper surface of said inlay exposed, said inlay including a foil member having a graphic on one surface thereof and having a translucent flexible plastic lens cap overlying said graphic; said graphic-bearing inlay being bonded to said base member and being sufficiently flexible so that it will remain bonded to said base member when said base member is deformed.

2. The emblem of claim 1 in which the bottom surface of the base member is concave.

3. The emblem of claim 1 wherein said base member is provided with a pressure-sensitive adhesive layer for attaching said emblem to the non-planar surface.

4. The emblem of claim 1 wherein said plastic lens cap is polyurethane.

5. The emblem of claim 4 wherein said inlay is fastened to said base member by an adhesive layer.

6. The emblem of claim 5 wherein said base member is formed from a thermoplastic elastomer.

7. The emblem of claim 4 wherein said polyurethane has a Shore D hardness in the range of approximately 45 to 65.

* * * * *